3,037,989
1,5 - BIS-(TRANS - 2 - HYDROXYCYCLOHEXYL) - 2-TRANS-HEXAHYDRO - BENZOXAZOLIDENE BIGUANIDE AND PROCESS

George I. Poos, Ambler, Pa., assignor to McNeil Laboratories, Incorporated, Philadelphia, Pa., a corporation of Pennsylvania
No Drawing. Filed June 17, 1959, Ser. No. 820,855
5 Claims. (Cl. 260—307)

This invention provides a new type of chemical compound, characterized by valuable hypertensive activity, and methods of preparing the same.

The particular object of this invention is the provision of a novel type of chemical compound.

A further object is to provide a novel chemical compound with hypertensive activity.

An additional object is the provision of novel methods of making the novel compound of the invention.

These and other objects will become evident from a consideration of the following specification and claims.

The novel type of compound provided by the present invention is 1,5-bis-(trans-2-hydroxycyclohexyl)-2-trans-hexahydrobenzoxazolidene biguanide having the empirical formula $C_{21}H_{36}N_6O_3$, which may be illustrated by the following structural formula:

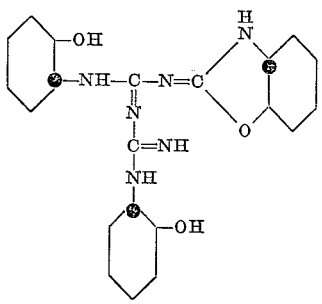

In the formula, the carbocyclic rings represent cyclohexyl rings, and the points marked by heavy dots represent positions of trans configuration. The double bond structure of this compound is not necessarily as illustrated since the compound can exist in a variety of different tautomeric forms, and it is not intended that the specific illustrated formula should be limiting.

The novel compound provided by this invention has hypertensive activity, that is the ability to increase blood pressure.

It has been discovered that by maintaining trans-2-amino 3a,4,5,6,7,7a-hexahydrobenzoxazole in solution in an inert organic solvent, that is a solvent which is non-reactive with the stated monomeric hexahydrobenzoxazole, trimerization of this hexahydrobenzoxazole is effected, to produce the novel compound provided by this invention, sometimes hereinafter referred to briefly as the trimer. Trimerization is also effected by triturating the trans-2-amino-3a,4,5,6,7,7a-hexahydrobenzoxazole in only sufficient water to form a paste, and can be effected by maintaining the trans-2-amino-3a,4,5,6,7,7a-hexahydrobenzoxazole itself in a molten state.

The compound trans-2-amino-3a,4,5,6,7,7a-hexahydrobenzoxazole is a fused oxazoline of the formula:

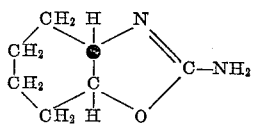

It can be prepared as described in copending application S.N. 820,856, filed of even date herewith. This compound is referred to hereinafter, for the sake of brevity, as the fused oxazoline.

To cause the trimerization to take place, as stated, the fused oxazoline may be maintained in solution in an inert organic liquid. In one embodiment of the invention, such inert liquid will be a solvent for the fused oxazoline. A variety of organic liquids may be employed as inert solvents in this connection. Thus, for example, the solvent may be an aliphatic hydrocarbon such as an alkane or alkene like pentane, hexane, monane, propylene trimer, or the like; or an aromatic hydrocarbon such as benzene, toluene, xylene and so forth. It may alternatively be an oxygen-containing liquid organic substance such as an ester, like ethyl acetate, an ether, like diethyl ether, dipropyl ether, methyl ether ether, tetrahydrofuran or the like, or a ketone such as methyl ethyl ketone, and so forth. Another class of organic liquids comprising inert solvents useful for the present purposes includes halogenated hydrocarbons such as chloroform, methylene chloride and trichloroethylene. Generally when an organic solvent is employed, the preferred type of solvent will be an aromatic hydrocarbon, benzene forming the preferred species. In this embodiment, the important feature is that the solvent selected be non-reactive with the fused oxazoline. In general, solvents that do not contain active hydrogen atoms are suitable. Solvents that react with the monomer lead to other monomeric products, and hence, hinder formation of the desired trimer. Of course, initially all the fused oxazoline need not dissolve in the solvent, so long as sufficient dissolves to initiate the reaction, further fused oxazoline going into solution as the reaction proceeds.

It has also been found possible to accomplish the trimerization of the fused oxazoline whereby the novel compound provided by this invention is prepared by triturating the stated fused oxazoline with water. In this case, only a relatively small amount of water is used; just sufficient to form a paste with the fused oxazoline. Trituration may be continued until reaction is complete as can be determined by melting point measurements, the trimer melting at about 178° C.

The conversion of the stated fused oxazoline to the trimer proceeds readily over a wide range of temperatures, including room temperature and below. The rate of trimerization is accelerated by the application of heat, and elevated temperatures over the range up to the decomposition temperature of the fused oxazoline may be employed to advantage. The reflux temperature of the solvent, in the embodiment of the invention using an inert organic solvent as reaction medium, forms a convenient temperature for conducting the reaction. As stated, trimerization may be effected by melting the fused oxazoline, and maintaining it in a molten condition.

Introduction of a small amount of an acid into the reaction mixture containing the fused oxazoline has been found to catalyze the trimerization reaction. Any of a wide variety of organic and inorganic acids may be used to effect the catalytic acceleration of the reaction. Thus, for example, the acid employed may be an inorganic acid such as hydrochloric acid or sulfuric acid; or it may be an organic acid, aliphatic or aromatic, carboxylic or sulfonic, such as acetic acid, propionic acid, benzoic acid or toluenesulfonic acid.

The pressure at which the reaction is conducted may be subatmospheric, superatmospheric or atmospheric. Generally the reaction proceeds with facility at atmospheric pressure and ordinarily will be conducted under such conditions.

The product of the trimerization, 1,5-bis-(trans-2-hydroxycyclohexyl)-2-trans-hexahydrobenzoxazolidene biguanide, has basic properties enabling it to form a salt with acids. The neutralization equivalent thereof indicates that the compound contains two nitrogen atoms which are basic, and the salts which it forms will accordingly include salts in which either or both of the basic nitrogens have been converted to a salt form. The salts of the stated trimer can readily be prepared by reaction between the trimer and the selected amount of acid, sufficient to react with either one or both of the basic nitrogen atoms thereof. Salts which may be prepared include, for example, the salts of the trimer with inorganic acids such as the hydrochloride, sulfate, phosphate, and so forth, as well as those with organic acids including monobasic acids such as the acetates and propionates as well as with hydroxy organic acids and dibasic organic acids such as the citrates, tartrates, malates, maleates, fumarates, succinates and picrates. In general such salts will be the equivalent of the base for most purposes and they are intended to be included herein and in the claims when reference is made herein to the stated trimer.

When the novel compound provided by this invention is to be used as a pharmaceutical, it will frequently be convenient to employ it in the form of one of its salts, since the salts are usually substantially more water-soluble than the trimer, and thereby are more readily adapted for formulation in compositions including aqueous media. In preparation of such salts, the acid selected will be such as to form a pharmaceutically acceptable salt. Any toxicity imparted by the acid used will be taken into consideration in administration of the compounds as in customary in the art. Pharmaceutically useful salts should not be substantially more toxic than the compound itself and should be able to be incorporated in liquid or solid or liquid pharmaceutical media for the preparation of therapeutically useful compositions.

The present invention will be more readily understood from a consideration of the following specific examples which are given for the purpose of illustration only and are not intended to limit the scope of the invention in any way.

*Example I*

This example illustrates the preparative method provided by this invention which comprises trimerization of trans-2-aminohexahydrobenzoxazole by maintaining the stated compound in solution in the inert solvent, employing an acid catalyst.

The starting material is prepared by a procedure as follows: Cyanogen bromide is formed by adding a solution of 4.45 g. (0.0907 mole) of sodium cyanide in methanol to a methanolic solution of 14.5 g. (0.0907 mole) of bromine at 0° C. To this solution is added a solution of 9.5 g. (0.082 mole) of trans-2-aminocyclohexanol in methanol, and the mixture is stirred for 10 minutes with ice bath cooling, after which the ice bath is removed and stirring of the reaction mixture is continued at room temperature for an additional one and a half hours. Ammonia is added to bring the solution of pH 10 and then the solution is concentrated under vacuum to remove the methanol. A concentrated sodium hydroxide solution is added to make the reaction mixture strongly basic. Then the solution is extracted 5 times with methylene chloride. After washing, drying, filtering and concentrating the methylene chloride extract, 7.96 g. of trans-2-amino-3a,4,5,6,7,7a-hexahydrobenzoxazole, as a white solid, is obtained.

To effect the trimerization to produce the product of this invention, 2.00 g. of the trans-2-aminohexahydrobenzoxazole (0.0143 mole) is dissolved in 40 ml. of dry benzene, to which there is added, as a catalyst, about 10 mg. of p-toluenesulfonic acid monohydrate. This reaction mixture is heated under reflux for 2.5 hours and then allowed to stand at room temperature overnight. The precipitate of benzene-insoluble material which forms is 1,5-bis-(trans-2-hydroxycyclohexyl)-2-trans-hexahydrobenzoxazolidene biguanide.

The crude product separating as the precipitate is collected on a filter and washed with benzene and acetone. This provides 1.73 g. of crystals of the material melting at 174–177° C. After recrystallization from acetone, the melting point is 176–177.5° C. The calculated analysis for $C_{21}H_{36}N_6O_3$ is C, 59.97; H, 8.63; N, 19.99; O, 11.41. That found is C, 59.81; H, 8.58; N, 19.41; 19.85; O, 11.85. The calculated molecular weight is 420; that found is 454. The infrared spectrum of the product shows $$\lambda_{max.}^{Nujol}$$

3.00, 3.23, 5.97, 6.12, 6.40μ. Its ultraviolet spectrum shown λ $H_2O$ max. 234 mμ (ε mol. 17.500).

The neutralization equivalent of the compound, as determined by potentiometric titration, is 216.

*Example II*

This example illustrates the preparative method of the invention which comprises triturating trans-2-aminohexahydrobenzoxazole with water.

A 100 mg. sample of trans-2-aminohexahydrobenzoxazole is slurried in a few drops of water to form a paste and let stand at room temperature. The sample is maintained in the moist state by addition of a drop of water from time to time. After three weeks, the melting point has risen considerably. The sample is then thoroughly dried in vacuo over phosphorus pentoxide for 48 hours. The dry product is washed 4 times with ether and recrystallized from acetone. There is thus obtained 55 mg. of product, m. 165–168° C., constitution 1,5-bis(trans-3-hydroxycyclohexyl) - 2 - trans-hexahydrobenzoxazolidene biguanide, having an infrared spectrum identical with that of the product of Example I.

The basic trimer can be converted to an acid salt thereof by dissolving it in acetone and adding to the solution 1 to 2 equivalents of an acid such as fumaric acid, and recovering the fumarate.

The trimer may be dissolved in sterile water with the aid of an acid to produce a pharmaceutical composition adapted for intravenous administration. A dose of 0.9 mg. per kg., i.v., increases the blood pressure in an anesthetized dog by 36 mm./Hg. The blood pressure remains above the control level for 22 minutes.

While the invention has been described with reference to various particular preferred embodiments thereof, it will be appreciated that modifications and variations can be made within the scope of the appended claims.

What is claimed is:

1. 1,5-bis-(trans-2-hydroxycyclohexyl)-2-trans-hexahydrobenzoxazolidene biguanide.

2. The method of preparing 1,5-bis(trans-2-hydroxycyclohexyl)-2-trans-hexahydrobenzoxazolidene biguanide which comprises heating a solution of trans-2-amino-3a,4,5,6,7,7a-hexahydrobenzoxazole in an inert organic solvent.

3. The method of claim 2 where said solution is heated in the presence of an acid.

4. The method of claim 2 wherein said solvent is an aromatic hydrocarbon.

5. The method of preparing 1,5-bis-(trans-2-hydroxycyclohexyl)-2-trans-hexahydrobenzoxazolidene biguanide, which comprises refluxing a solution of trans-2-amino-3a,4,5,6,7,7a-hexahydrobenzoxazole with a catalytic amount of p-toluenesulfonic acid in benzene.

References Cited in the file of this patent

Birckenbach et al.: Ber. Deut. Chem., vol. 64B, pages 961–8 (1931).

Birckenbach et al.: Ber. Deut. Chem., vol. 66B, pages 1571–7 (1933).

Ribas et al.: Chem. Abstracts, vol. 30, page 5985 (1936).